US012679693B2

(12) United States Patent
Mascari et al.

(10) Patent No.: US 12,679,693 B2

(45) Date of Patent: Jul. 14, 2026

(54) REMOTE ELEVATOR DESTINATION DISPATCH AND AUTHORIZATION SYSTEM AND METHOD WITH SECURED BLE BEACONS AND SECURITY FALL-BACK

(71) Applicant: braXos Security Software LLC, New Albany, OH (US)

(72) Inventors: Mike Mascari, West Palm Beach, FL (US); Mathew Sheets, Santa Rosa Beach, FL (US)

(73) Assignee: braXos Security Software LLC, New Albany, OH (US)

( * ) Notice: Subject to any disclaimer, the term of this patent is extended or adjusted under 35 U.S.C. 154(b) by 1456 days.

(21) Appl. No.: 17/234,481

(22) Filed: Apr. 19, 2021

(65) Prior Publication Data

US 2021/0323789 A1 Oct. 21, 2021

Related U.S. Application Data

(60) Provisional application No. 63/048,465, filed on Jul. 6, 2020, provisional application No. 63/012,152, filed on Apr. 18, 2020.

(51) Int. Cl.
*B66B 1/46* (2006.01)
*B66B 1/24* (2006.01)

(52) U.S. Cl.
CPC ............ *B66B 1/468* (2013.01); *B66B 1/2408* (2013.01); *B66B 2201/103* (2013.01); *B66B 2201/4615* (2013.01)

(58) Field of Classification Search
CPC .. B66B 1/468; B66B 2201/235; B66B 1/3461
See application file for complete search history.

(56) References Cited

U.S. PATENT DOCUMENTS

| | | | | |
|---|---|---|---|---|
| 8,151,942 | B2 * | 4/2012 | Rusanen | B66B 1/468 187/247 |
| 9,850,093 | B2 * | 12/2017 | DePaola | G07C 9/00896 |
| 10,235,854 | B2 * | 3/2019 | Trani | H04W 4/021 |
| 10,771,458 | B1 * | 9/2020 | Xia | H04W 12/64 |
| 11,100,379 | B1 * | 8/2021 | Bennett | G06K 19/0718 |
| 2015/0381740 | A1 * | 12/2015 | Gwin | H04W 4/80 709/228 |
| 2017/0341903 | A1 | 11/2017 | Adkins et al. | |
| 2018/0118509 | A1 | 5/2018 | Simcik et al. | |
| 2018/0201473 | A1 * | 7/2018 | Noxon | G07C 9/00896 |
| 2018/0201474 | A1 * | 7/2018 | Noxon | H04W 8/005 |
| 2018/0346282 | A1 | 12/2018 | Simcik et al. | |
| 2019/0084794 | A1 * | 3/2019 | Scoville | B66B 1/468 |
| 2019/0100405 | A1 * | 4/2019 | Scoville | B66B 1/3415 |
| 2019/0135580 | A1 | 5/2019 | Scoville | |

(Continued)

*Primary Examiner* — Shawki S Ismail

(74) *Attorney, Agent, or Firm* — Standley Law Group LLP; Jeffrey C. Norris; Kenny W. Pung

(57) ABSTRACT

A system or method comprising and/or adapted for use with a remote or mobile application for dispatch or authorization of an elevator. An exemplary embodiment may further comprise programmable BLE beacons using shared secret key hashing technology, a cloud-services layer, and an on-premise middleware component. In an exemplary embodiment, a system or method may be adapted to listen in near real-time via a communications protocol such as WebSockets for car call requests and kiosk access control authorization messages.

30 Claims, 6 Drawing Sheets

(56) References Cited

U.S. PATENT DOCUMENTS

| | | | | |
|---|---|---|---|---|
| 2020/0087108 | A1* | 3/2020 | Gireddy | B66B 1/468 |
| 2020/0239275 | A1* | 7/2020 | Ladi | H04W 4/023 |
| 2023/0294959 | A1* | 9/2023 | Pamanes | B66B 1/3461<br>187/380 |

* cited by examiner

REMOTE ELEVATOR DESTINATION DISPATCH AND AUTHORIZATION SYSTEM AND METHOD WITH SECURED BLE BEACONS AND SECURITY FALL-BACK

This application claims the priority benefit of U.S. Provisional Application No. 63/048,465, filed Jul. 6, 2020, and U.S. Provisional Application No. 63/012,152, filed Apr. 18, 2020, which are each incorporated by reference in its entirety.

BACKGROUND AND SUMMARY OF THE INVENTION

Exemplary embodiments of the present invention relate generally to systems and methods for elevator dispatch and/or authorization.

Destination Dispatch elevator systems provide riders the ability to make a call for an elevator car to take them to their desired destination floor by selecting their destination at a touch-screen. The elevator system then uses the additional knowledge of the destination (unlike traditional Up/Down hall call configurations) to make an optimal car allocation decision. Once the car arrives to pick up the rider, the door jamb of the elevator car shows the destination(s) to which the car will be delivered. The user enters a car with no destination buttons inside, and the car makes its registered stops.

Destination Dispatch elevator manufacturers provide APIs (i.e., application programming interfaces) to allow 3rd party systems to interact with the system. The APIs are typically used to facilitate security integrations, whereby access to certain destination floors first requires some form of authorization by the 3rd party system usually in response to a rider presenting a credential (e.g., card or fob). Most also allow the 3rd party systems to make elevator calls, typically for turnstile applications.

The ability of 3rd party systems to make car calls has opened the opportunity to provide a mobile application to perform the action instead of a user interoperating with the kiosk. Because destination dispatch kiosks are one of few points of contact in a building everyone touches (even more so than traditional hall call buttons) and because of the existence of global pandemics (e.g., COVID-19), there is a need to invent a mechanism that allows users to make car calls with their own devices. Previous approaches at solving this issue involve either using the mobile device's GeoLocation capabilities, the introduction of BLE (i.e., Bluetooth Low Energy) beacons, or a QR code that is scanned near the kiosk.

The problem with the aforementioned known designs is a lack of security. GeoLocation settings can be manipulated on the phone, and the unique identifier emitted by traditional BLE beacons can be reproduced in software, as can the code scanned by a QR code label. Some buildings may be tolerant of the above risks, but would still have a need for counter-measures to restrict nefarious activity.

Further, because there is simplicity of interacting with a kiosk, there is a need to be able to call for a car to the most frequently requested destination floor with similar simplicity.

Finally, some elevator destination dispatch customers do not have an ACS (access control system) integration controlling access to destination floors, but have a need to restrict access to only certain individuals and at certain times.

Exemplary embodiments of the present invention may satisfy some or all of the aforementioned needs. In an exemplary embodiment, a system and method may enable a remote (e.g., mobile, web, etc.) application user to either call an elevator car for dispatch to a selected destination or gain access to otherwise-restricted floors. In an exemplary embodiment, physical proximity to the elevators may be guaranteed, or, if not, additional counter-measures may be taken.

One example of a system may comprise the use of multiple components including an iOS and/or Android mobile application, a programmable BLE beacon, a cloud-hosted services layer, and an on-premise middleware device that interoperates with a destination dispatch elevator system's APIs using IP-based protocols.

In an exemplary embodiment, a mobile application's role is to:

(1) allow self-registration of the rider;

(2) confirm the physical proximity of a rider to the elevators through the use of GeoLocation services and/or programmable BLE beacons;

(3) allow for the rider to call a car for building management-authorized destination floors from building management-authorized source floors, either by explicitly selecting a source floor and destination floor, a destination floor only, or by using a gesture (e.g., shaking the phone) to call a default home floor or the only authorized source floor/destination floor combination; and/or (4) allow for the rider to unlock secured floors at a kiosk without taking their mobile device out of their pocket. In some exemplary embodiments, a mobile application may not be considered to be an integral element of a claimed system or method of the present invention.

In an exemplary embodiment, a programmable BLE beacon's role is to securely allow the proximity of the rider to be confirmed by a cloud-based services layer, and to provide an opportunity for a mobile application to take automatic action as a rider enters the beacon's range. An example of the BLE beacon may do this by being a generator of HMAC-Based One-Time Password identifiers (c.f., RFC4226). In an exemplary embodiment, a secret key (e.g., a secret key hashed with a counter) used by the BLE beacon may be programmed at the time of deployment, and is known by the cloud-hosted services. An example of a counter used may be a time-based counter (TOTP) as defined in Time-Based One-Time Password (TBOTP) (c.f., RFC6238). Other exemplary embodiments may implement another similar or suitable transmitter adapted to provide the desired functionality.

In an exemplary embodiment, a cloud-hosted services layer's role is to participate in the self-registration of riders, provide a mobile application with sufficient building information to allow a rider to register a car call, authorize car calls by validating a TOTP token reported by a nearby beacon, and report back to the rider the car allocated. An example of a cloud-hosted services layer may also authorize rider access to secured floors at a nearby kiosk by communicating with an on-premise middleware device (e.g., using a communications protocol such as WebSockets). However, some exemplary embodiments may substitute a networked device or system that is not based in the cloud for performing the same or similar functions.

In an exemplary embodiment, an on-premise middleware's role is to communicate with an elevator manufacturer's destination dispatch APIs to perform car call registration, and report back to a cloud-hosted services layer the car allocation information. In addition, an example of an on-premise middleware may listen for access control (floor unlock) requests from a cloud-hosted services layer and may subsequently invoke a corresponding destination dispatch manufacturer's API to unlock secured floors. Some exemplary embodiments may not require middleware, while other exemplary embodiments may implement middleware that is not on-premise.

While certain functionality is described above, other exemplary embodiments of a remote (e.g., mobile) application, a programmable BLE beacon, a cloud services layer, and a middleware may be adapted to provide some or all of the aforementioned functionality to suit a particular use. Moreover, as noted above, some exemplary embodiments may have an alternative configuration that is adapted to provide some or all of the aforementioned functionality to suit a particular use. Furthermore, an elevator, elevator controller, and/or kiosk may or may not be considered to be an integral element of a claimed system or method of the present invention.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Figure 1:
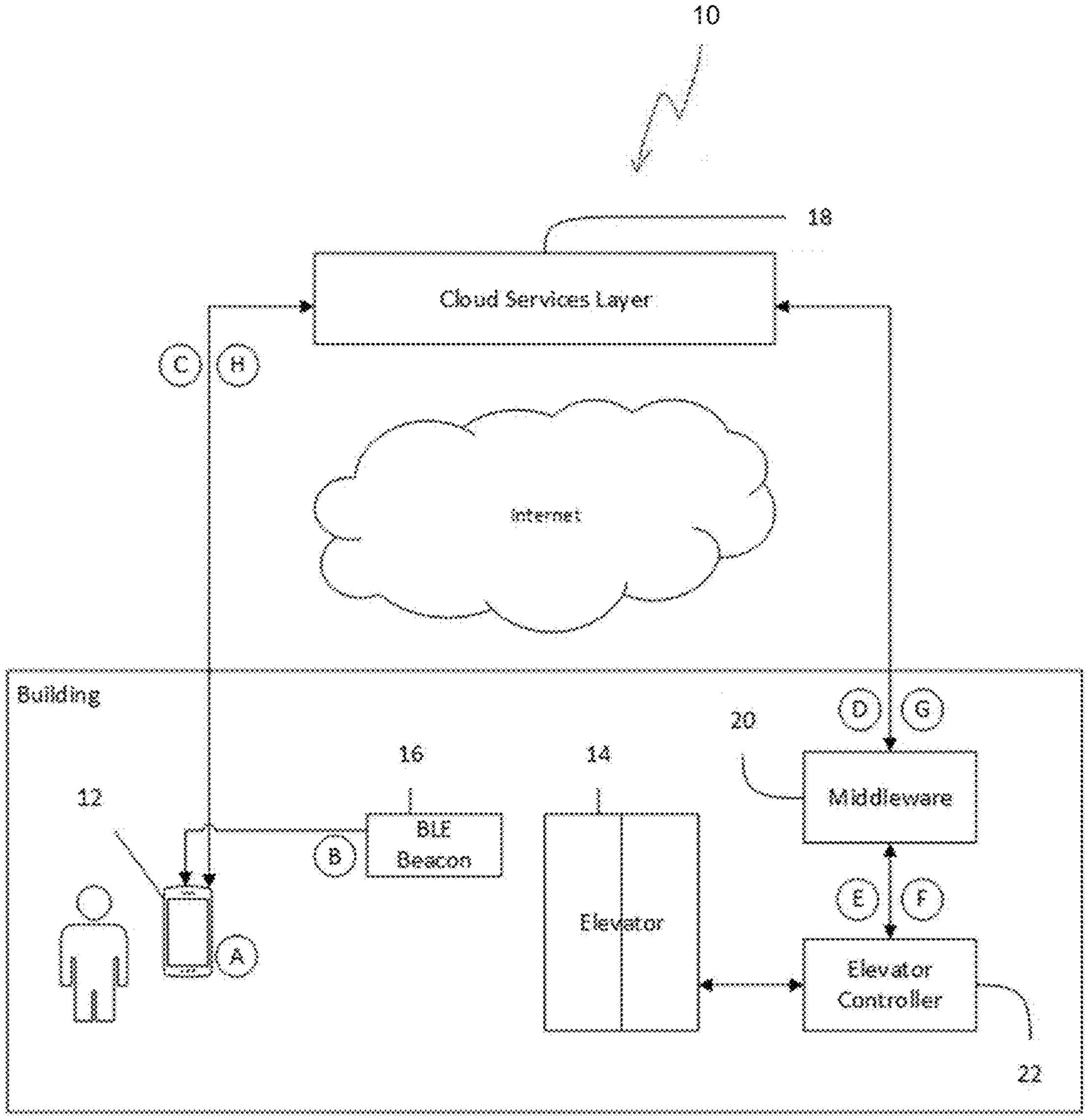
FIG. 1 is a schematic component interaction diagram with sequence numbers, illustrating a sequence of steps used in an example of a system and method for secure car call registration and allocation. In this exemplary embodiment, once a user enters physical proximity to a programmable BLE beacon, a mobile app permits the user to register a car call that ultimately dispatches an elevator and displays to the user the car that was allocated.

The terminology used herein is for the purpose of describing particular embodiments only and is not intended to be limiting of the invention. As used herein, the term "and/or" includes any and all combinations of one or more of the associated listed items. As used herein, the singular forms "a," "an", and "the" are intended to include the plural forms as well as the singular forms, unless the context clearly indicates otherwise. It will be further understood that the terms "comprises" and/or "comprising", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefits and each can also be used in conjunction with one or more, or in some cases all, of the other disclosed steps and techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present disclosure is to be considered as an exemplification of the invention, and is not intended to limit the invention to the specific embodiments illustrated by the figures or description below.

Exemplary embodiments of the present invention are directed to a system and method for dispatch of an elevator car and/or floor authorization. FIGS. 1-4 illustrate various exemplary embodiments of a system, wherein functional steps of a method of these examples are also indicated in the diagrams. As aforementioned, other exemplary embodiments may implement any or all of those functions or steps. Various communication protocols, standards, and equipment are described in these examples. Unless otherwise expressly set forth, other similar or suitable protocols, standards, and equipment may be implemented to achieve the desired functions. For example, as technology evolves, other protocols, standards, and equipment may become preferred or necessary.

The examples of FIGS. 1-4 reference and are particularly beneficial for the use of destination dispatch elevator systems. Nonetheless, other exemplary embodiments may be adapted for other types of elevator systems. Exemplary embodiments are particularly useful when a user has an application on their mobile phone for use of a system and method. However, other types of electronic devices (e.g., personal computers, tablets, watches, etc.), which are preferably but not necessarily mobile, may be configured with an application for use of a system and method.

FIG. 1 shows an exemplary embodiment of a system and method 10 for secure car call registration and allocation. This figure contains a sequence labelling of the component interactions of the invention, where a rider may register or make a call (i.e., communication) securely for an elevator car to take the rider to a selected destination floor. As used herein, the term "component" may include, but is not limited to, a system (e.g., a cloud services layer and/or middleware may be a system). In this example, the following sequence of interactions occur, per the figure labelling:

(A) A user puts the mobile application 12 (i.e., situated on a mobile phone) into the foreground such that it is in proximity to an elevator 14.

(B) A programmable BLE Beacon 16 emits a Time-Based One-Time Password (TBOTP) as its identifier to the mobile application 12. In an exemplary embodiment, a TBOTP value may change every 5 minutes to ensure the security of the identifier.

(C) The mobile application 12 communicates the BLE Beacon's Time-Based One Time Password (TBOTP) to a cloud services layer 18 via a communications protocol such as JavaScript Object Notification (JSON) over hypertext transfer protocol secure (HTTPS), which responds with a set of at least one authorized destination floor for which the user may register a call. The user makes a destination floor selection and submits the car registration request to the cloud services layer 18 such as via JSON over HTTPS.

(D) In this exemplary embodiment, the cloud services layer 18 identifies the appropriate communications channel based upon the building identified by the TBOTP, and sends the car registration request via a communications protocol such as an active HTTPS WebSocket to a middleware component 20. In the car registration request is an internally generated 32-bit recycled transaction ID (or other suitable transaction ID), which is used to correlate the request with the car allocation message received in step F.

(E) The middleware component 20 communicates with the manufacturer's destination dispatch elevator controller 22 over an IP network in compliance with the manufacturer's API, registering the car call with the transaction ID generated by the cloud services layer 18.

(F) Once a car is allocated by the destination dispatch system, a car allocation message is transmitted to the middleware 20 with the transaction ID used in the car registration request, as well as the elevator car allocated.

(G) The middleware component 20 forwards the car allocation message to the cloud services layer 18 via a communications protocol such as an HTTPS POST of JSON.

(H) The cloud services layer 18 uses the transaction ID to identify which mobile application user is associated with the request, and relays the car name that was allocated to the mobile application 12 via a communications protocol such as a JSON-based HTTPS response, which then displays the message to the user (e.g., Please proceed to Car C).

Figure 2:
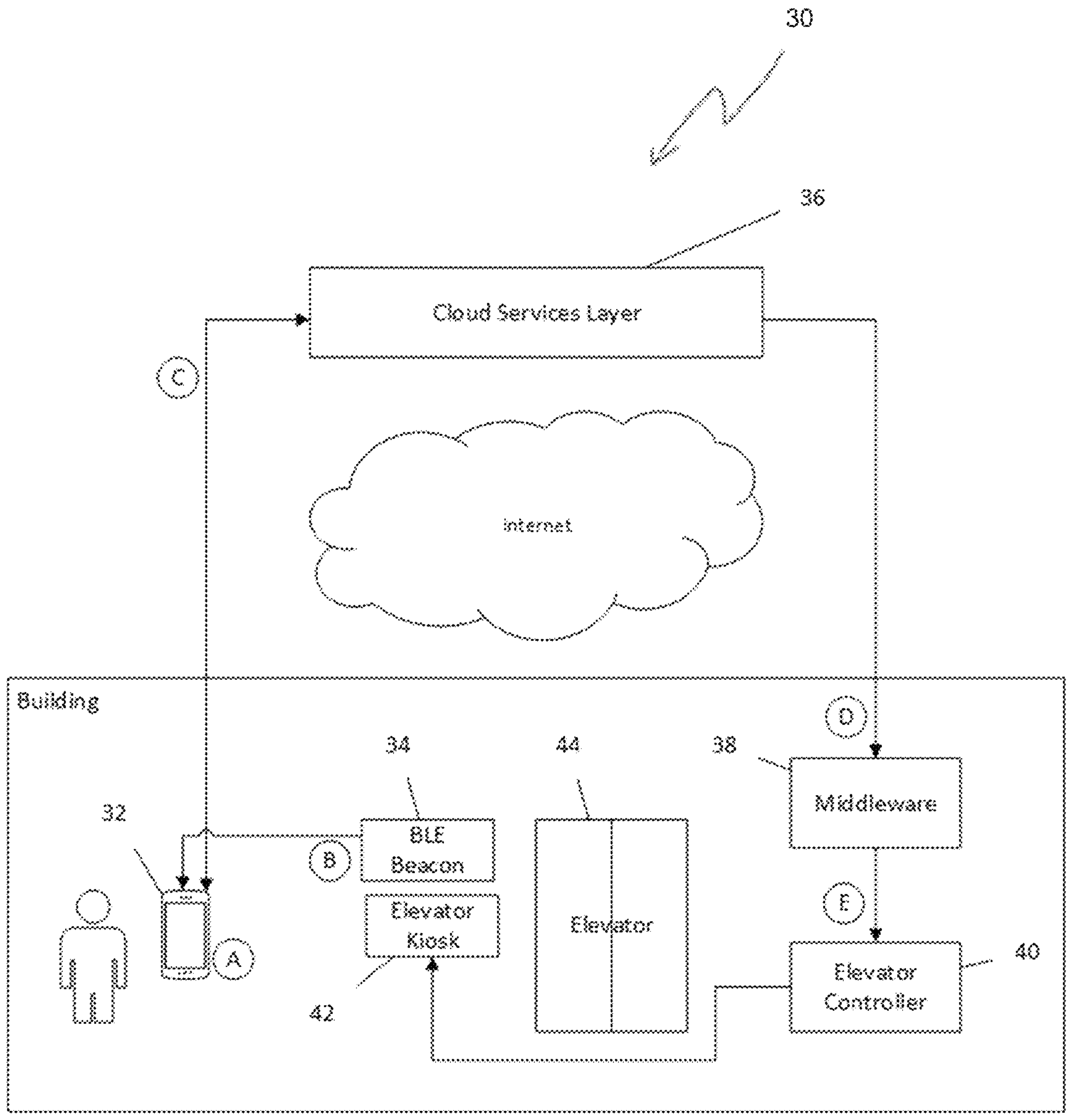
FIG. 2 is a schematic component interaction diagram with sequence numbers, illustrating a sequence of steps executed in an exemplary embodiment of a system and method that facilitates secure auto-detect kiosk unlock, such as when a mobile app user wants to authorize their access to secured floors at an elevator kiosk, without even removing their phone from their pocket.

FIG. 2 shows an exemplary embodiment of a system and method 30 that facilitates secure auto-detect kiosk unlocking. This figure contains a sequence labelling of the component interactions of the invention wherein the rider can access at least one otherwise-restricted destination floor at the elevator manufacturer's kiosk. The following sequence of interactions occur, per the figure labelling:

(A) A user may keep their mobile phone/mobile application 32 in their pocket (i.e., does nothing with it).

(B) In an exemplary embodiment, a programmable BLE Beacon 34 may emit a Time-Based One-Time Password (TBOTP) as its identifier to the mobile application 32. For example, this TBOTP value may change every 5 minutes to ensure the security of the identifier.

(C) The mobile application 32 communicates the BLE Beacon's Time-Based One-Time Password (TBOTP) to a cloud services layer 36 via a communications protocol such as JSON over HTTPS.

(D) The cloud services layer 36 identifies the appropriate communications channel based upon the building and kiosk identified by the TBOTP, and sends a kiosk authorization via a communications protocol such as an active HTTPS WebSocket to a middleware component 38.

(E) The middleware component 38 communicates with the manufacturer's destination dispatch elevator controller 40 and/or directly with an elevator kiosk 42 over an IP network in compliance with the manufacturer's API, authorizing access to otherwise-secured floors at the designated kiosk 42. In an exemplary embodiment, the kiosk 42 reacts to the security authorization message by allowing the rider to select otherwise-secured destination floors associated with an elevator 44.

Figure 3:
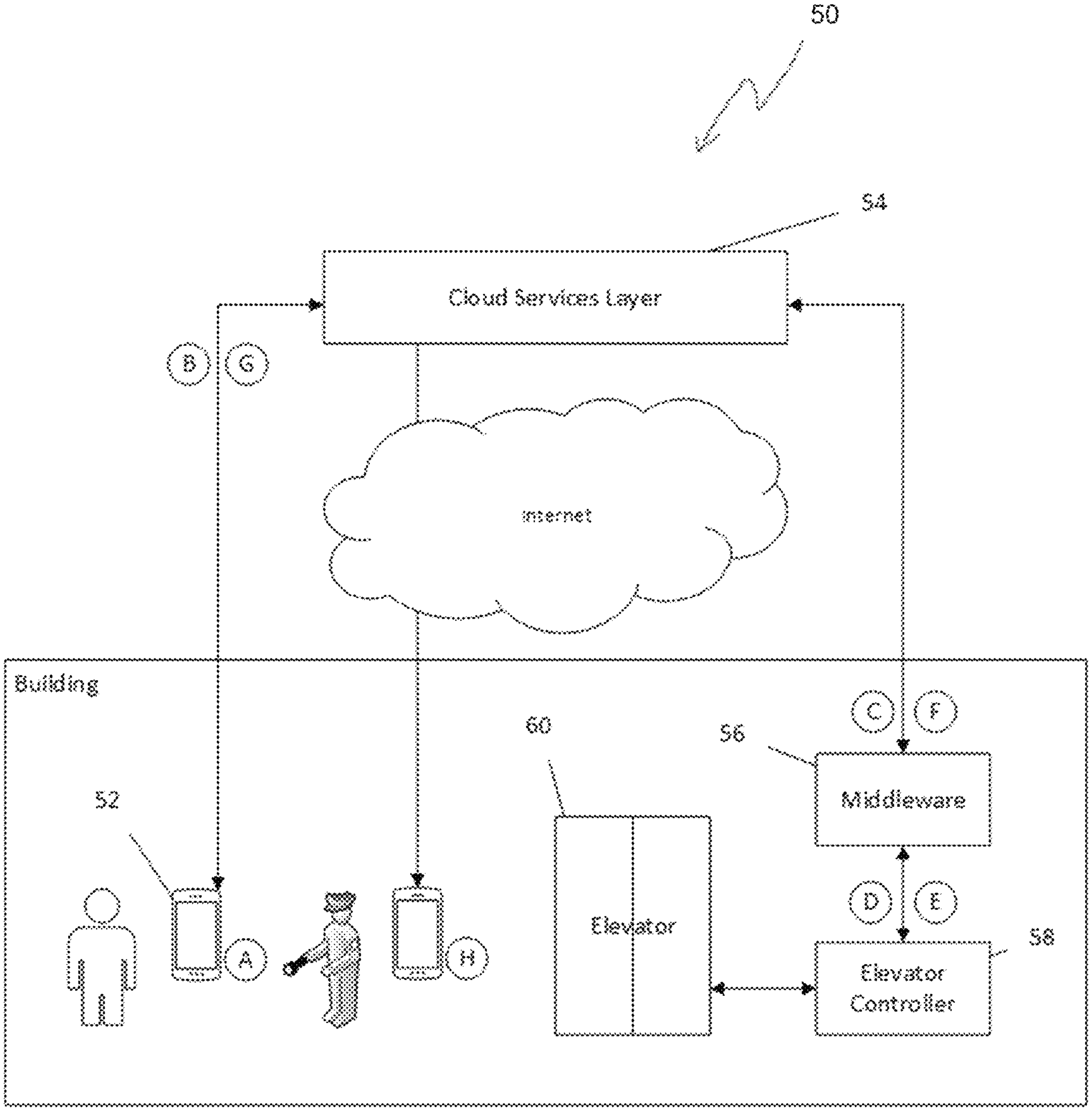
FIG. 3 is a schematic component interaction diagram with sequence numbers, illustrating a sequence of steps in another exemplary embodiment of a system and method for car registration and allocation such as when performing car call registrations in environments where secure BLE beacons cannot be deployed.

FIG. 3 shows an exemplary embodiment of a system and method 50 for adapted car call registration and allocation. This figure contains a sequence labelling of the component interactions of the invention, wherein the rider makes a car registration in an environment without, for example, secured BLE beacons. The following sequence of interactions occur, per the figure labelling:

(A) A user puts a mobile application/mobile device 52 into the foreground.

(B) A mobile application 52 communicates with a cloud services layer 54 via a communications protocol such as JSON over HTTPS, which responds with a set of at least one authorized source and/or destination floor for which the user may register a call based upon the GeoLocation (or similar location service) reported by the mobile device 52 in its JSON payload. The user makes a source and/or destination floor selection and submits the car registration request to the cloud services layer 54 via a communications protocol such as JSON over HTTPS.

(C) If the user has not hit their daily car call threshold, the cloud services layer 54 identifies the appropriate communications channel based upon the building identified by the GeoLocation (or similar location service) in the JSON payload, and sends the car registration request via a communications protocol such as an active HTTPS WebSocket to an on-premise middleware component 56. In the car registration request may be, for example, an internally generated 32-bit recycled transaction ID (or other suitable transaction ID), which is used to correlate the request with the car allocation message received in step E.

(D) The middleware component 56 communicates with the manufacturer's destination dispatch elevator controller 58, which is associated with elevator 60, over an IP network in compliance with the manufacturer's API, registering the car call with the transaction ID generated by the cloud services layer 54.

(E) Once a car is allocated by the destination dispatch system, a car allocation message is transmitted to the middleware 56 over IP with the transaction ID used in the car registration request, as well as the elevator car allocated.

(F) The middleware component 56 forwards the car allocation message to the cloud services layer 54 via a communications protocol such as an HTTPS POST of JSON.

(G) The cloud services layer 54 uses the transaction ID to identify which mobile application user is associated with the request, and relays the car name that was allocated to the mobile application 52 via a communications protocol such as a JSON HTTPS response, which then displays the message to the user (e.g.: Please proceed to Car C).

(H) If, in Step C, the cloud services layer 54 has determined that the user has reached their daily car call quota, then the call is rejected and the designated building administrators may be notified via a communications protocol such as an HTTPS POST of the notification callback endpoint provided by the mobile phone manufacturer (e.g., Apple, Google, etc.) of the excess call event, where they may then disable the user's account.

Figure 4:
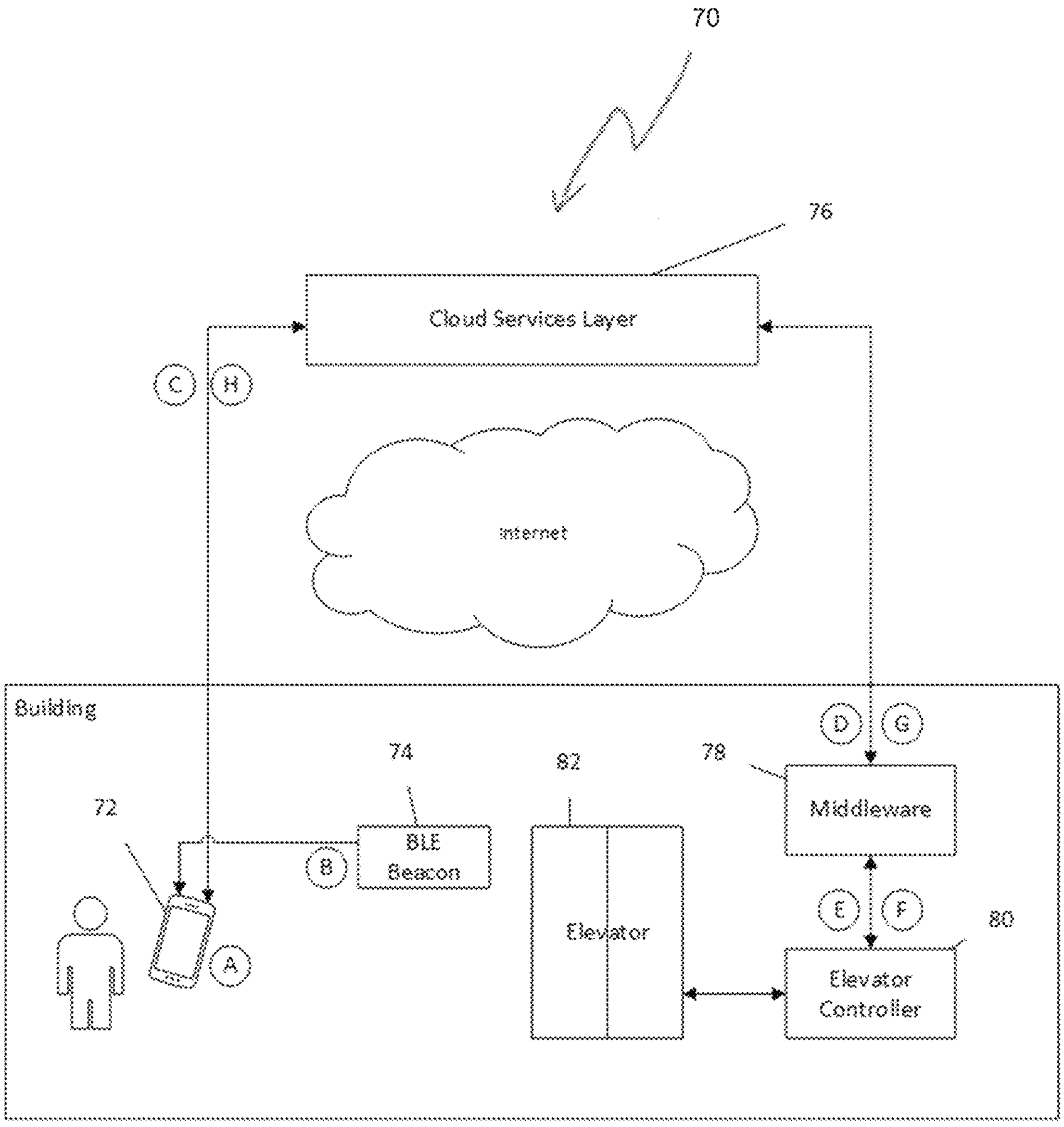
FIG. 4 is a schematic component interaction diagram with sequence numbers, illustrating a sequence of steps of an exemplary embodiment of a system and method for default destination car call registration and allocation. An exemplary embodiment may facilitate registering a call for an elevator by a user to their default floor by using a motion recognition feature (e.g., a shake gesture) with their mobile phone.

FIG. 4 shows an exemplary embodiment of a system and method 70 adapted for default destination car call registration and allocation through a shake gesture. This figure contains a sequence labelling of the component interactions of the invention, where a rider may register a call securely for an elevator car to take the rider to a default floor by simply shaking their mobile phone (or another motion recognition feature) when within the proximity of BLE beacons (or other suitable location device). However, in another exemplary embodiment, a rider may not have to take any action to make or confirm a call for an elevator car to take the rider to a default floor. In either embodiment, the following sequence of interactions occur, per the figure labelling:

(A) A user has a mobile application 72.

(B) In this exemplary embodiment, a programmable BLE Beacon 74 emits a Time-Based One-Time Password (TBOTP) as its identifier to the mobile application 72. This TBOTP value may, for example, change every 5 minutes to ensure the security of the identifier.

(C) Upon the shaking of the phone (and/or other mobile recognition feature) or alternatively without confirmation, the mobile application 72 communicates the BLE Beacon's Time-Based One-Time Password (TBOTP) to a cloud services layer 76 via a communications protocol such as an HTTPS POST of JSON, along with an indication (i.e., in a car registration request) of a configurable default floor that is selected.

(D) The cloud services layer 76 identifies the appropriate communications channel based upon the building identified by the TBOTP, and sends the car registration request via a communications protocol such as an active HTTPS WebSocket to an on-premise middleware component 78. In the car registration request may be, for example, an internally generated 32-bit recycled transaction ID (or other suitable transaction ID), which is used to correlate the request with the car allocation message received in step F.

(E) The middleware component 78 communicates with the manufacturer's destination dispatch elevator controller 80, which is associated with elevator 82, over an IP network in compliance with the manufacturer's API, registering the car call with the transaction ID generated by the cloud services layer 76.

(F) Once a car is allocated by the destination dispatch system, a car allocation message is transmitted to the middleware 78 with the transaction ID used in the car registration request, as well as the elevator car allocated over the IP network.

(G) The middleware component 78 forwards the car allocation message to the cloud services layer 76 by way of a communications protocol such as an HTTPS POST of JSON.

(H) The cloud services layer 76 uses the transaction ID to identify which mobile application user is associated with the request, and relays the car name that was allocated to the mobile application 72 via a communications protocol such as an HTTPS response of JSON, which then displays the message to the user (e.g., Please proceed to Car C).

Figure 5:
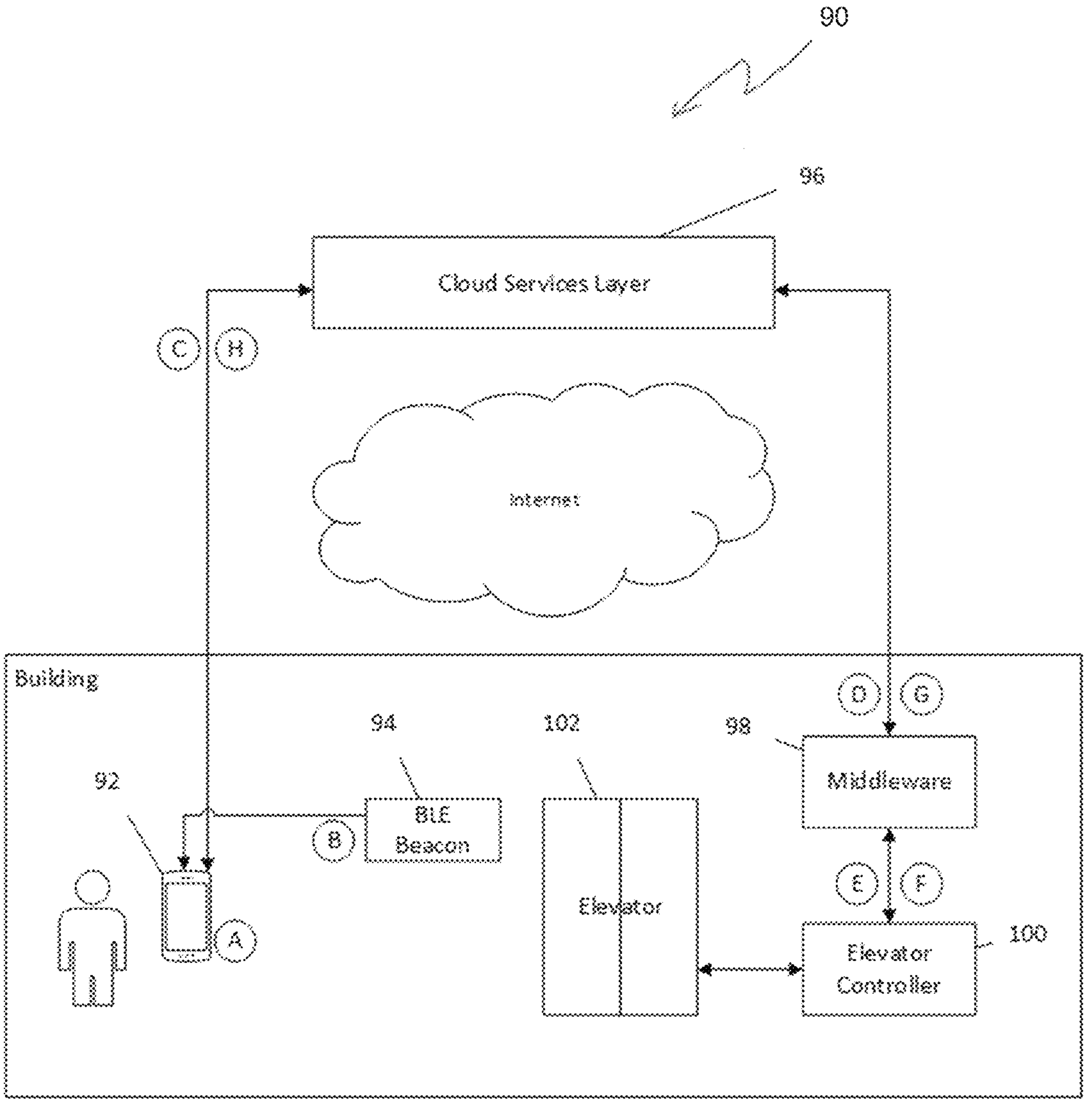
FIG. 5 is a schematic component interaction diagram with sequence numbers, illustrating a sequence of steps used in an example of a system and method for secure car call registration and allocation. In this exemplary embodiment, a mobile app includes or is associated with a home button that a user may activate to identify at least one authorized destination floor for which the user may register a call.

FIG. 5 shows an exemplary embodiment of a system and method 90 for secure car call registration and allocation. This figure contains a sequence labelling of the component interactions of the invention, where a rider may actively register or make a secure call (i.e., communication) for an elevator car using a home button (or the like, which may be physical or virtual) associated with a mobile application to take the rider to a selected destination floor. In one exemplary embodiment, users may quickly call an elevator for a destination from the home screen of their mobile devices, rather than first having to launch the application. By hard-pressing on the application icon, users may select a destination among frequently visited floors. Once selected, the application may launch, calling the destination. In this example, the following sequence of interactions may occur, per the figure labelling:

(A) A user activates a home button associated with a mobile application 92 (i.e., situated on a mobile phone) such that the mobile application identifies a set of at least one authorized destination floor for which the user may register a call, and the user then makes a destination floor selection. In one exemplary embodiment, the user enters the range of a BLE beacon.

(B) Either before or after (including the same time) the user makes the destination floor selection, a programmable BLE Beacon 94 emits a Time-Based One-Time Password (TBOTP) as its identifier to the mobile application 92. In an exemplary embodiment, a TBOTP value may change every 5 minutes to ensure the security of the identifier.

In one exemplary embodiment, BLE beacon 94 may advertise a secret+time-based hash advertisement. Upon a hard-press (3D press) of the application icon by the user, frequently accessed destinations may be displayed by the mobile application, wherein the user may select a desired destination (as previously noted in Step A).

(C) The mobile application 92 communicates the BLE Beacon's Time-Based One Time Password (TBOTP) and a car registration request comprising the destination floor selection to a cloud services layer 96 via a communications protocol such as JavaScript Object Notification (JSON) over hypertext transfer protocol secure (HTTPS). For example, in one embodiment, the application may be put into the foreground and a destination call may be placed to the cloud services layer 96.

(D) In this exemplary embodiment, the cloud services layer 96 identifies the appropriate communications channel based upon the building identified by the TBOTP, and sends the car registration request via a communications protocol such as an active HTTPS WebSocket to a middleware component 98. In the car registration request is an internally generated 32-bit recycled transaction ID (or other suitable transaction ID), which is used to correlate the request with the car allocation message received in step F.

In this example, middleware component 98 is situated on-premise. In other exemplary embodiments, a middleware component may not be on-premise.

(E) The middleware component 98 communicates with the manufacturer's destination dispatch elevator controller 100, which is associated with elevator 102, over an IP network in compliance with the manufacturer's API, registering the car call with the transaction ID generated by the cloud services layer 96.

(F) Once a car is allocated by the destination dispatch system, a car allocation message is transmitted by elevator controller 100 to the middleware 98 with the transaction ID used in the car registration request, as well as the elevator car allocated.

(G) The middleware component 98 forwards the car allocation message to the cloud services layer 96 via a communications protocol such as an HTTPS POST of JSON.

(H) The cloud services layer 96 uses the transaction ID to identify which mobile application user is associated with the request, and relays the car name that was allocated to the mobile application 92 via a communications protocol such as a JSON-based HTTPS response, which then displays the message to the user (e.g., Please proceed to Car C).

Figure 6:
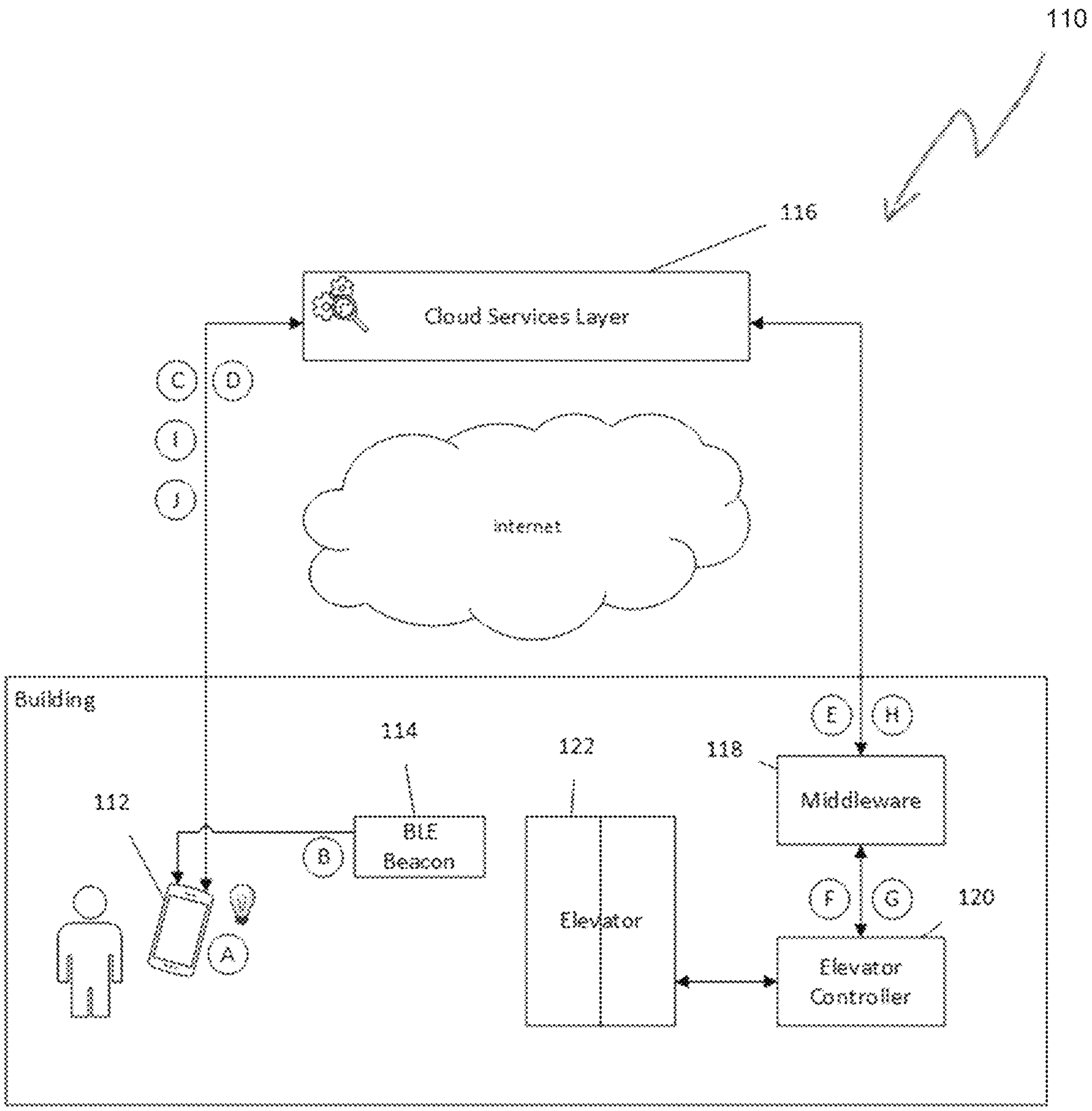
FIG. 6 is a schematic component interaction diagram with sequence numbers, illustrating a sequence of steps of an exemplary embodiment of a system and method for default destination car call registration and allocation. An exemplary embodiment may collect data and learn the tendencies of a user (e.g., time, location, and/or floor of the user's car registration requests) in order to be able to suggest future car registration requests by the user.

FIG. 6 shows an exemplary embodiment of a system and method 110 adapted for destination car call registration and allocation through a shake gesture. This figure contains a sequence labelling of the component interactions of the invention, where a rider may register a call securely for an elevator car to take the rider to a default floor by simply shaking their mobile phone (or another motion recognition feature) when within the proximity of BLE beacons (or other suitable location device), wherein the system or method 110 is further adapted to collect data and learn the tendencies of the user (e.g., time, location, and/or floor, etc. of the user's car registration requests) in order to be able to facilitate future car registration requests by the user. However, in another exemplary embodiment, a rider may not have to take any action to make or confirm a call for an elevator car to take the rider to a default floor. For instance, in one exemplary embodiment, a user who has placed the same calls for the same destinations from the same source floors around the same time of day may, through a machine learning process of system or method 110, be invited to create a scheduled automatic call to automatically call the destination without needing the user to make a destination selection. In either embodiment, the following sequence of interactions may occur, per the figure labelling:

(A) A user has a mobile application 112. In an exemplary embodiment, a user enters the range of a BLE beacon.

(B) In this exemplary embodiment, a programmable BLE Beacon 114 emits a Time-Based One-Time Password (TBOTP) as its identifier to the mobile application 112. This TBOTP value may, for example, change every 5 minutes to ensure the security of the identifier.

In one exemplary embodiment, BLE Beacon 114 may advertise a secret+time-based hash advertisement to the application, which may allow the user to make a destination selection. If the machine learning is sufficient to suggest the creation of a scheduled car call, it may do so (see Step C), else the user may select a destination in the absence of sufficient machine learning at that point.

(C) Either before or after step (B) (including the same time), a cloud services layer 116 transmits a suggested car registration request (e.g., a scheduled car call) to the mobile application 112.

(D) Upon the shaking of the phone (and/or other mobile recognition feature) or alternatively without confirmation, the mobile application 112 communicates the BLE Beacon's Time-Based One-Time Password (TBOTP) to the cloud services layer 116 via a communications protocol such as an HTTPS POST of JSON, along with the suggested car registration request, or the user has an option to substitute a different car registration request (e.g., select a different time, location, floor, etc.), either of which will hereafter be referred to as the car registration request. The cloud services layer 116 collects data related to the car registration request (e.g., regarding the time, location, and/or floor, etc.) to assist with the formation of a future suggested car registration request. For example, cloud services layer 116 may "train" a machine learning algorithm about the most recent call and route the call to on-premise middleware (Step E).

(E) The cloud services layer 116 identifies the appropriate communications channel based upon the building identified by the TBOTP, and sends the car registration request via a communications protocol such as an active HTTPS WebSocket to an on-premise middleware component 118. In the car registration request may be, for example, an internally generated 32-bit recycled transaction ID (or other suitable transaction ID), which is used to correlate the request with the car allocation message received in step G.

(F) The middleware component 118 communicates with the manufacturer's destination dispatch elevator controller 120, which is associated with elevator 122, over an IP network in compliance with the manufacturer's API, registering the car call with the transaction ID generated by the cloud services layer 116.

(G) Once a car is allocated by the destination dispatch system, a car allocation message is transmitted by elevator controller 120 to the middleware 118 with the transaction ID used in the car registration request, as well as the elevator car allocated over the IP network.

(H) The middleware component 118 informs the cloud services layer 116 of the car allocated. In particular, in this example, middleware component 118 forwards the car allocation message to the cloud services layer 116 by way of a communications protocol such as an HTTPS POST of JSON.

(I) The cloud services layer 116 uses the transaction ID to identify which mobile application user is associated with the request, and relays the car name that was allocated to the mobile application 112 via a communications protocol such as an HTTPS response of JSON, which then displays the message to the user (e.g., Please proceed to Car C).

(J) The cloud services layer 116 transmits the future suggested car registration request to the mobile application 112 the next time it is predicted that the user needs an elevator.

Any of the exemplary embodiments may further allow for improved monitoring of the use of an elevator. For example, a system may be adapted to track (e.g., via a cloud services layer) who called an elevator to what floor during a given period of time. An exemplary embodiment may also allow for the setting of thresholds or rules (e.g., via a cloud services layer) regarding the use of an elevator and the distribution and/or receipt of alerts (e.g., such as regarding those thresholds or rules), which may result in restricted access.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

What is claimed is:

1. A method for registering a car registration request with an elevator controller for an elevator, comprising:

providing a beacon adapted to transmit an identifier that is a one-time password;

transmitting said identifier such that said identifier is adapted to be received by a mobile application to confirm proximity of the mobile application to an elevator, such that the mobile application is then adapted to generate a car registration request for an elevator;

receiving said car registration request;

generating a transaction ID that is associated with said car registration request;

registering said transaction ID with said car registration request on an elevator controller;

receiving a car allocation message that comprises said transaction ID and an elevator car allocation; and using said transaction ID to relay said elevator car allocation to said mobile application.

2. The method of claim 1 wherein said identifier is a time-based one-time password.

3. The method of claim 1 wherein said mobile application is adapted to transmit said identifier, said method further comprising:

receiving said identifier from said mobile application prior to receiving said car registration request; and transmitting a set of at least one authorized floor to said mobile device such that said mobile device is adapted to generate said car registration request.

4. The method of claim 1 further comprising a cloud-hosted service that performs the following steps of the method:

receiving said car registration request;

generating a transaction ID that is associated with said car registration request; and using said transaction ID to relay said elevator car allocation to said mobile application.

5. The method of claim 4 further comprising a middleware component that facilitates communication between said cloud-hosted service and said elevator controller, wherein said middleware component performs the following steps of the method:

registering said transaction ID with said car registration request on an elevator controller; and receiving a car allocation message that comprises said transaction ID and an elevator car allocation.

6. A method for authorizing access to at least one otherwise-secured floor associated with an elevator, comprising:

providing a beacon adapter to transmit an identifier that is a one-time password;

transmitting said identifier such that said identifier is adapted to be received by a mobile application to confirm proximity to an elevator;

receiving said identifier from said mobile application wherein said mobile application is adapted to communicate said identifier to a cloud-hosted service; and generating an elevator kiosk authorization from said cloud-hosted service that is adapted to be received by an elevator controller and/or an elevator kiosk such that access is authorized to at least one otherwise-secured floor associated with said elevator kiosk.

7. The method of claim 6 wherein, after initial registration, a user of said mobile application is not required to interact with said mobile application to cause said mobile application to communicate said identifier to said cloud-hosted service.

8. The method of claim 6 wherein said identifier is a time-based one-time password that is transmitted by a beacon.

9. The method of claim 6 further comprising a middleware component that facilitates communication between said cloud-hosted service and an elevator controller and/or said elevator kiosk.

10. A method for registering a car registration request with an elevator controller for an elevator, comprising:

receiving a car registration request from a mobile application;

determining whether a user of said mobile application has hit a daily car call threshold before generating said transaction ID;

generating a transaction ID that is associated with said car registration request if the user has not hit said daily car call threshold;

registering said transaction ID with said car registration request on an elevator controller;

receiving a car allocation message that comprises said transaction ID and an elevator car allocation; and using said transaction ID to relay said elevator car allocation to said mobile application;

wherein said transaction ID is not generated if the user has hit said daily car call threshold.

11. The method of claim 10 further comprising:

prior to receiving said car registration request from said mobile application, transmitting a set of at least one authorized floor to said mobile device such that said mobile device is adapted to generate said car registration request.

12. The method of claim 11 wherein a location of said mobile device is used to determine said set of at least one authorized floor.

13. The method of claim 11 wherein said car registration request includes a floor selection.

14. The method of claim 10 further comprising a cloud-hosted service that performs the following steps of the method:

receiving a car registration request from a mobile application;

generating a transaction ID that is associated with said car registration request; and using said transaction ID to relay said elevator car allocation to said mobile application.

15. The method of claim 14 further comprising a middleware component that facilitates communication between said cloud-hosted service and said elevator controller, wherein said middleware component performs the following steps of the method:

registering said transaction ID with said car registration request on an elevator controller; and receiving a car allocation message that comprises said transaction ID and an elevator car allocation.

16. A method for registering a car registration request with an elevator controller for an elevator, comprising:

transmitting an identifier that is adapted to be received by a mobile application situated on a device such that the mobile application is adapted to generate a car registration request that includes a floor selection when said device is motion-activated by a user of said device or alternatively without requiring any confirmation by a user of said mobile application;

receiving said car registration request;

generating a transaction ID that is associated with said car registration request;

registering said transaction ID with said car registration request on an elevator controller;

receiving a car allocation message that comprises said transaction ID and an elevator car allocation; and using said transaction ID to relay said elevator car allocation to said mobile application.

17. The method of claim 16 wherein said identifier is a time-based one-time password that is transmitted by a beacon.

18. The method of claim 16 further comprising a cloud-hosted service that performs the following steps of the method:

receiving said car registration request;

generating a transaction ID that is associated with said car registration request; and using said transaction ID to relay said elevator car allocation to said mobile application.

19. The method of claim 18 further comprising a middleware component that facilitates communication between said cloud-hosted service and said elevator controller, wherein said middleware component performs the following steps of the method:

registering said transaction ID with said car registration request on an elevator controller; and receiving a car allocation message that comprises said transaction ID and an elevator car allocation.

20. A method for registering a car registration request with an elevator controller for an elevator, comprising:

providing a mobile application that enables a user to activate a home button such that the mobile application identifies a set of at least one authorized destination floor for which the user may register a call;

transmitting an identifier that is adapted to be received by said mobile application;

from said mobile application, transmitting said identifier and a car registration request that is comprised of a floor selection by a user of said mobile application;

receiving said car registration request;

generating a transaction ID that is associated with said car registration request;

registering said transaction ID with said car registration request on an elevator controller;

receiving a car allocation message that comprises said transaction ID and an elevator car allocation; and using said transaction ID to relay said elevator car allocation to said mobile application.

21. The method of claim 20 wherein said identifier is a time-based one-time password that is transmitted by a beacon.

22. The method of claim 20 wherein said home button associated with said mobile application is selected from the group consisting of physical home buttons and virtual home buttons.

23. The method of claim 20 further comprising a cloud-hosted service that performs the following steps of the method:

receiving said car registration request;

generating a transaction ID that is associated with said car registration request; and using said transaction ID to relay said elevator car allocation to said mobile application.

24. The method of claim 23 further comprising a middleware component that facilitates communication between said cloud-hosted service and said elevator controller, wherein said middleware component performs the following steps of the method:

registering said transaction ID with said car registration request on an elevator controller; and receiving a car allocation message that comprises said transaction ID and an elevator car allocation.

25. A method for registering a car registration request with an elevator controller for an elevator, comprising:

transmitting an identifier that is adapted to be received by a mobile application situated on a device;

either before or after transmission of said identifier, transmitting a suggested car registration request to said mobile application;

upon motion-activation of said device or alternatively without requiring any confirmation by a user of said mobile application, transmitting said identifier and said car registration request, or a different car registration request, which are collectively hereafter referred to as said car registration request;

receiving said car registration request;

generating a transaction ID that is associated with said car registration request;

registering said transaction ID with said car registration request on an elevator controller;

receiving a car allocation message that comprises said transaction ID and an elevator car allocation; and using said transaction ID to relay said elevator car allocation to said mobile application.

26. The method of claim 25 wherein said identifier is a time-based one-time password that is transmitted by a beacon.

27. The method of claim 25 further comprising a cloud-hosted service that performs the following steps of the method:

receiving said car registration request;

generating a transaction ID that is associated with said car registration request; and using said transaction ID to relay said elevator car allocation to said mobile application.

28. The method of claim 25 further comprising a middleware component that facilitates communication between said cloud-hosted service and said elevator controller, wherein said middleware component performs the following steps of the method:

registering said transaction ID with said car registration request on an elevator controller; and receiving a car allocation message that comprises said transaction ID and an elevator car allocation.

29. The method of claim 25 further comprising the step of collecting data related to said car registration request to facilitate formation of a future suggested car registration request.

30. The method of claim 29 further comprising the step of transmitting said future car registration request to said mobile application a next time it is predicted that said user needs an elevator.

* * * * *